March 31, 1964     E. M. VAN BUSKIRK     3,127,340
GRAIN SEPARATOR FOR COMBINE
Original Filed April 28, 1958     3 Sheets-Sheet 1
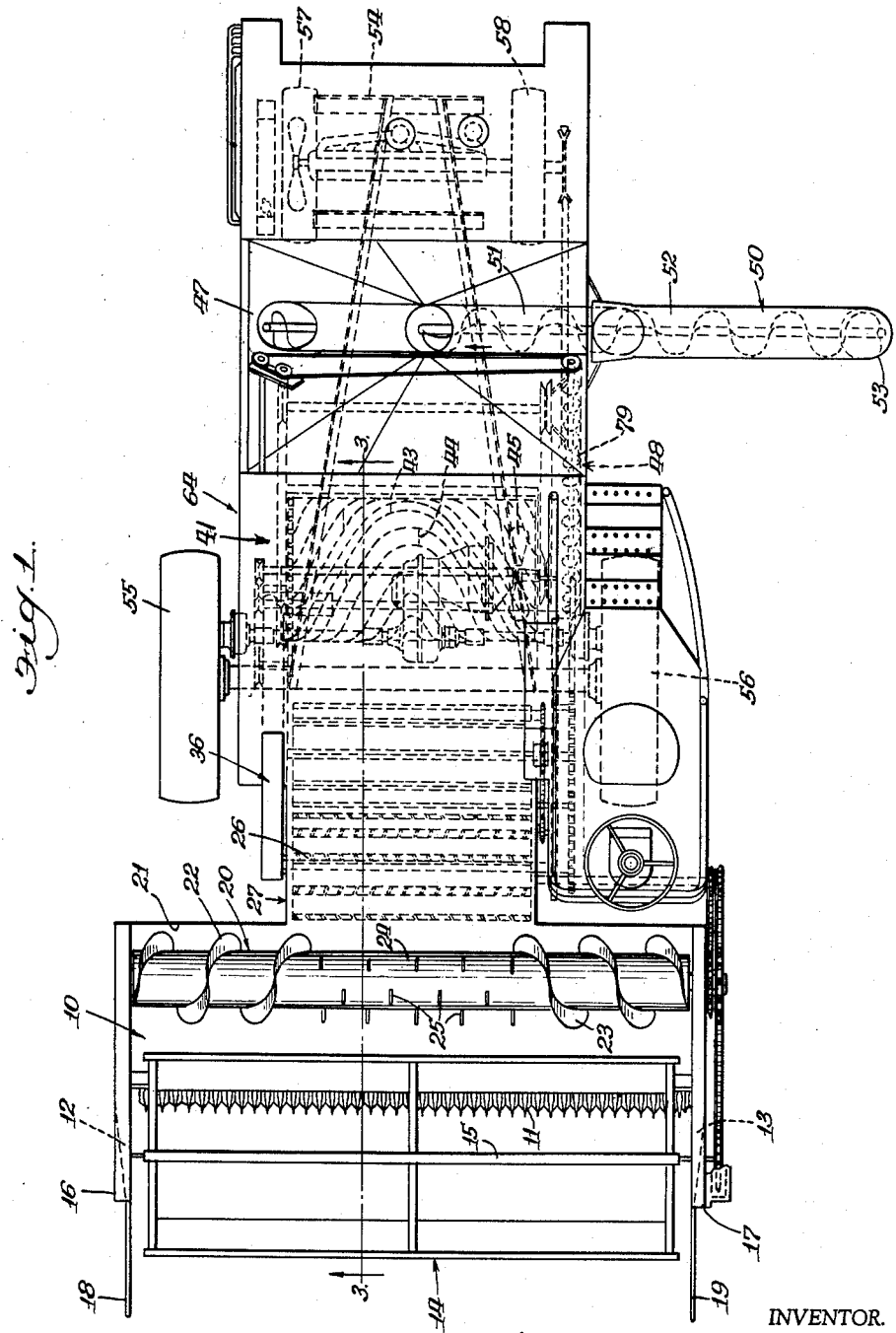
INVENTOR.
Ernest M. Van Buskirk
BY Paul O. Pippel
Atty.

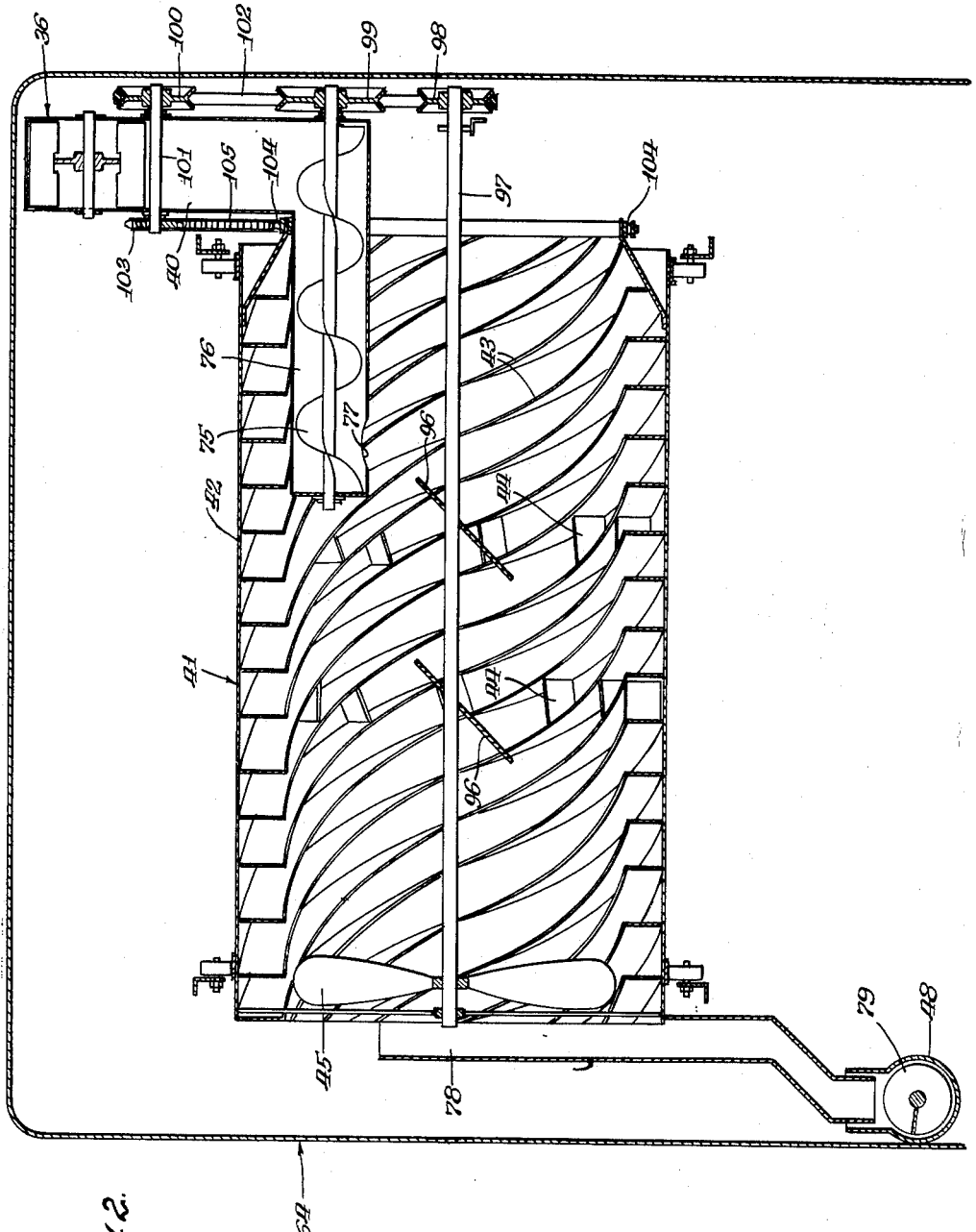

March 31, 1964 E. M. VAN BUSKIRK 3,127,340
GRAIN SEPARATOR FOR COMBINE
Original Filed April 28, 1959 3 Sheets-Sheet 3
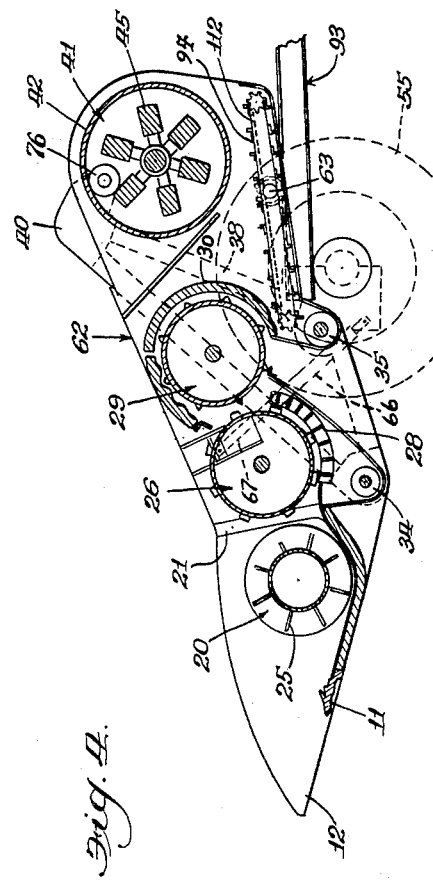
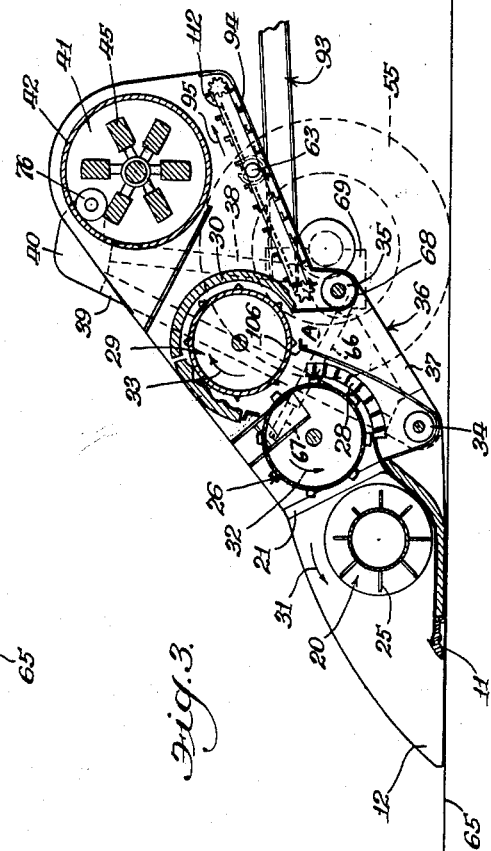
INVENTOR.
Ernest M. Van Buskirk
BY
Paul O. Pippel
Atty.

United States Patent Office 3,127,340
Patented Mar. 31, 1964

3,127,340
GRAIN SEPARATOR FOR COMBINE
Ernest M. Van Buskirk, East Moline, Ill., assignor to International Harvester Company, Chicago, Ill., a corporation of New Jersey
Continuation of application Ser. No. 731,213, Apr. 28, 1958. This application Nov. 6, 1961, Ser. No. 151,593
2 Claims. (Cl. 209—152)

This invention relates to a new and improved combine and more particularly to a grain separator for a combine. This application is a continuation of the application entitled "Combine," filed April 28, 1958, Serial No. 731,-213, now abandoned.

Combines or harvester-threshers as they are otherwise known have long been considered one of the largest and costliest of farm implements. This has been true because it has performed the several functions of harvesting standing grain, elevating the harvested grain into a threshing mechanism, separating the threshed grain from the hulls and straw, discharging the chaff and other waste material, and collecting the threshed and cleaned grain in a suitable receptacle. It is obvious that with so many elements the size of the machine becomes an important problem. Implement engineers have for many years sought ways and means of reducing both the physical size of the entire machine, as well as the cost of these combines.

It is therefore a primary object of this invention to equip harvester-thresher elements with complementary centrifugal and rotary separators to insure the final and complete separation of straw from threshed grain.

An important object of this device is to provide a harvester-thresher which is not affected by gravity but will cut and thresh efficiently on hillside fields as well as on level ground.

Other and further important objects and advantages of this invention will become apparent from the disclosures in the following specification and accompanying drawings.

In the drawings:

FIGURE 1 is a top plan view of the combine of this invention.

FIGURE 2 is an enlarged transverse sectional view of the cleaning chamber employed in the device of this invention.

FIGURE 3 is a sectional view taken on the line 3—3 of FIGURE 1.

FIGURE 4 is another sectional view similar to FIGURE 3 but showing the combine elements in raised position.

As shown in the drawings: The reference numeral 10 indicates generally a harvester-thresher platform having a cutter bar 11 across the forward end thereof and defined at its ends by end walls or gathering points 12 and 13. These points 12 and 13 extend forwardly from the platform 10 and guide the standing grain into the scope of the cutter bar 11 at the forward end of the combine.

A reel 14 such as is used on most harvester-threshers and having a center shaft 15 is journally mounted for rotation on spaced-apart arm members 16 and 17 extending forwardly from and supported on the platform 10. Rod members 18 and 19 in the shape of semicircles join the forward ends of the spaced-apart arms 16 and 17 and extend forwardly, down and around for attachment to the gathering point end walls 12 and 13 respectively.

The platform 10 carries what is known in the industry as a straight through auger conveyor 20. The auger conveyor 20 is journaled within the ends 12 and 13 of the platform and is disposed substantially adjacent to the back wall 21 thereof.

The auger conveyor 20 includes sections of screw flight 22 and 23 adjacent the ends thereof. The screw flights are oppositely pitched to cause grain being fed thereto to be fed laterally inwardly toward a center section 24 of the straight through auger conveyor 20. The center section 24 of this conveyor includes a plurality of radially disposed retractable fingers 25 to cause the grain or other material fed to the platform 10 to be swept downwardly and under the auger conveyor 20 so that the material is positively fed into the scope of a threshing cylinder 26. The threshing cylinder 26 is located in what has previously been a feeder housing 27.

In the present device the feeder housing 27 contains the threshing units of this device. The threshing cylinder 26, as best shown in FIGURES 3 and 4, cooperates with a concave 28 to thereby cause a threshing of the grain and straw as it is fed therethrough from the auger conveyor 20 by means of the retractable fingers 25. An auxiliary separating or threshing cylinder 29 is disposed immediately back of and slightly above the cylinder 26 and arranged with a cooperative concave 30 over the top thereof so that as the grain moves through the underside and up the back of the primary threshing cylinder 26 it is immediately fed between the cylinder 29 and its cooperative concave 30 at the top thereof and thereupon runs over the top of the cylinder 29. It will be apparent from the disclosure of FIGURE 3 that the direction of rotation of the straight through auger conveyor 20 and the threshing cylinder 26 is the same while the second cylinder or cleaner 29, rotates in the opposite direction. The arrow 31 shows the rotation of the auger conveyor 20 to be downwardly and thence rearwardly at its forward face to thus feed material under the center section 24 thereof. The threshing cylinder also rotates downwardly and under as shown by the arrow at 32. The second cylinder 29 rotates upwardly and over, as shown by the arrow 33, so that the path of material from the time of its deposit on the platform is under and finally over. Whole straw which passes through these three conveyor elements is discharged in an area whence the straw drops downwardly and directly to the ground. A major portion of the remaining material drops downwardly through the perforated concaves 28 and 30 and thence into transversely disposed auger conveyors 34 and 35 respectively. A raddle 94 is provided beneath the auxiliary cylinder and concave 29—30 to carry straw and trash upwardly and rearwardly in the direction of the arrow 95 whereafter the straw and trash are discharged to the ground. A screen 112 is provided intermediate the chains of the raddle to permit grain to drop therethrough and be carried downwardly by the lower chain flight to the auger 35. The auger conveyor 34 is disposed generally beneath the cylinder and concave 26—28 and, similarly, the auger 35 is disposed substantially beneath the auxiliary cylinder and its concave 29—30. The auger conveyors 34 and 35 run entirely across the feeder housing 27 and terminate in an elevator 36 on the side of the feeder housing. As shown in FIGURE 3, the elevator 36 has a lower section 37 joining the two auger conveyors 34 and 35, a second generally upright portion 38 and a return section 39. The portions or sections 38 and 39 join in a discharge spout 40 which is arranged and constructed to deliver and feed the threshed grain to a housing or cleaning chamber 41 through a laterally disposed dicharging auger 75 and its tubular housing 76. As shown in FIGURE 2 the tubular housing 76 has a discharge opening 77 at a position within the cleaning chamber 41.

As further shown in FIGURE 2 the cleaning chamber 41 incldues a rotary drum 42 having a plurality of spiral passages on the inner surface thereof as shown at 43. Dams 44 are provided intermittently of the spiral passages 43 to cause the grain to be lifted through the drum 42 to the top thereof and thence dropped downwardly vertically through the drum, through which an air current is passed. Angularly disposed sheets 96 are fastened to the rotor shaft 97 to cause the falling grain to be deflected axially toward the clean grain discharge end and thereby prevent grain piling up at any one position within the rotor or drum 42. A V-pulley 98 is mounted on the outer end of the shaft 97 opposite the cleaning fan 45 and is in planar alignment with V-pulleys 99 and 100 on the auger 75 and jack-shaft 101 whereby a V-belt 102 may impart drive to all of these elements. The jack-shaft 101 is journally mounted in the delivery spout 40 of the elevator 36. On the end of the shaft 101 opposite the V-pulley 100 is mounted a sprocket 103. An enlarged ring sprocket 104 is formed around the end of the basket-like rotor 42 as shown in FIGURE 2. A chain 105 joins the sprockets 103 and 104 and imparts drive to the rotor 42. Fan 45 is driven by shaft 97 to provide an air current or draft of air, whereupon the light dirt or dust and trash is removed endwise from the drum 42 and the grain is delivered by the spiral passages 43 to the other end of the drum and dropped into a hopper 78 for delivery to a tubular elevator 48 inclined upwardly and rearwardly. An auger conveyor 79 is mounted in the tubular housing 48 and carries the clean grain to a grain-receiving tank 47. The threshed and cleaned grain thus, is delivered by the auger conveyor elevator 48—79 to a point of discharge over the grain tank 47.

The grain tank 47 is unloaded by means of an elevator 50 having a stationary section 51 generally vertically disposed in the bottom of the tank 47 and a hinged section 52 which folds over the grain tank for transport or is outwardly and upwardly extended. The elevator 50 is positioned and extends substantially from the center of the grain tank 47 and projects laterally and upwardly to a discharge end 53.

Immediately to the rear of the grain tank 47 is the source of power supply in the form of an engine 54 to effect the driving the various threshing, harvesting and cleaning elements of this machine as well as to provide propulsion for the vehicle.

The unitary frame structure 62 is pivotally mounted for arcuate adjustable movement with respect to the frame structure 93 which carries the elongated body 64 of the implement and which houses the grain tank 47 and the engine 54, as well as being itself mounted on and made portable and field traversing by the wheels 55, 56, 57, and 58. In the position of the frame structure 62, as shown in FIGURE 3, the platform 10 is relatively flush with the ground line 65 so that grain cut by the sickle is cut very close to the roots of the plant. Means are provided for effecting an adjustable relationship of the frame structure 62 with respect to the frame-supporting structure 93 whereby the frame 62 may be shifted to an upper position as shown in FIGURE 4 whereupon the grain is cut relatively high from the ground line 65 and the machine is generally arranged in this manner during transport thereof. The means for accomplishing an adjustable positioning of the harvesting and threashing elements on the frame 62 is shown as a hydraulic cylinder 66 and piston rod 67 which is pivotally mounted at 68 on bracket members 69 depending from the main supporting frame 93 as shown in both of FIGURES 3 and 4. in FIGURE 3 the piston rod 67 is generally retracted within the cylinder 66 whereas in FIGURE 4 the piston rod 67 has been extended considerably from the cylinder 66 to thereupon cause a raising by swinging around the pivot shaft 63.

The arrangement of the harvesting, threshing, and cleaning elements on the forwardly inclined scoop-shovel type of frame structure 62 permits a greater versatility of the combine and more universal use regardless of the terrain over which the machine operates. It is apparent that such a device can operate just as efficiently on hillsides as on flat plains inasmuch as the threshing and cleaning units are not dependent on the machine remaining horizontally level.

In the operation of the separating device 41 of this machine grain is received from the discharging hopper and as the rotor 42 turns about its axis the grain is moved by the spiral tracks 43 therein to cause a winding or a spiraling of the material transversely of the machine to the side thereof opposite the grain input elevator 36. Dam members 44 at strategic points in the spiral paths cause the grain to be dropped from the top of the basket-like rotor 42 through a blast of air delivered by the fan 45 in a direction opposite the delivery of the clean grain. Thus small dirt particles or trash are removed by blowing out through this opposite side of the rotor basket 42. The grain falling down through the tubular rotor 42 drops into the bottom of the drum or basket again and is carried to succeeding spiral tracks, whereafter it continues through to the side of the cleaner chamber or housing 41 for delivery into the hopper 78 and thence into the lower end of the elevator 48 which carries the grain to the tank 47.

It is apparent that herein is provided a new type of harvester-thresher in which the harvester, thresher, and cleaning mechanisms are included in a swingably adjustable single unit whereby the implement is more universally usable throughout all types of crop conditions and/or on any terrain on which crops are planted. Numerous details of construction may be varied throughout a wide range without departing from the principles disclosed herein and I therefore do not propose limiting the patent granted hereon otherwise than as indicated by the appended claims.

What is claimed is:

1. A structure for removing unwanted light particles from a mixture including both heavy grain particles and unwanted light particles, comprising:

a rotor including a first exit aperture adjacent one end thereof and a second exit aperture adjacent the other end thereof, means for turning said rotor, means defining an entrance aperture disposed between said exit apertures for feeding the mixture to the inside of said rotor, spiral track means affixed to the inside of said rotor along substantially the entire length thereof for feeding said heavy grain particles in a given direction along the axis of said rotor for discharge through said second exit aperture, blower means, mounted within said rotor at said other end, for delivering a current of air through said rotor in a direction substantially opposite said given direction to force the unwanted light particles out through said first exit aperture, said spiral track means including a plurality of dam members spaced intermittently therearound to assist in raising the mixture of grain particles and unwanted particles, thereby causing the mixture of particles to fall through said current of air and enable the blower means to force said unwanted light particles out through said first exit aperture, at least one angularly disposed member positioned within said rotor and means for supporting said member centrally within the rotor to deflect the falling grain particles toward said second exit aperture.

2. A structure for removing light particles from a mixture including both heavy grain particles and unwanted light particles, comprising:

a rotor including a central shaft and a housing, said housing defining a first exit aperture adjacent one end thereof and a second exit aperture adjacent the other end thereof, means for turning said rotor and for rotating said central shaft, means defining an entrance aperture disposed between said exit apertures for feeding the mixture to the inside of said rotor, grain lifting and forwarding means affixed to the inside of said rotor along substantially the entire length thereof for raising the grain to the top of said rotor and permitting it to drop and for feeding said heavy grain particles in a given direction along the axis of said rotor for discharge through said second exit aperture, and fan means, mounted within said rotor at said other end and coupled to said shaft, for delivering a current of air through said rotor as said shaft is rotated, said air passing in a direction substantially opposite said given direction to force the unwanted light particles out through said first exit aperture, at least one angularly disposed member secured to said central shaft within said rotor to deflect the falling grain particles toward said second exit aperture.

References Cited in the file of this patent

UNITED STATES PATENTS

| | | |
|---|---|---|
| 409,589 | Jacobson | Aug. 20, 1889 |
| 1,673,848 | Stebbins | June 19, 1928 |

FOREIGN PATENTS

| | | |
|---|---|---|
| 57,185 | Norway | Oct. 19, 1936 |
| 125,972 | Germany | Nov. 28, 1901 |